United States Patent
Wilson et al.

(10) Patent No.: US 7,152,571 B1
(45) Date of Patent: Dec. 26, 2006

(54) LUBRICATION SYSTEM HAVING A GASKET WITH INTEGRATED LUBRICATION CHANNEL

(75) Inventors: Thomas H. Wilson, Macomb, MI (US); Tom O. Michael, Canton, MI (US); Tom Suchecki, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/247,712

(22) Filed: Oct. 11, 2005

(51) Int. Cl.
*F16J 15/00* (2006.01)
(52) U.S. Cl. .................................. 123/196 R; 277/318
(58) Field of Classification Search ............ 123/196 R; 277/318
See application file for complete search history.

(56) References Cited

U.S. PATENT DOCUMENTS

2002/0130468 A1* 9/2002 Kawai et al. ............... 277/318

* cited by examiner

*Primary Examiner*—Stephen K. Cronin
*Assistant Examiner*—Jason Benton
(74) *Attorney, Agent, or Firm*—Diana D. Brehob

(57) ABSTRACT

The present invention is directed to a lubrication system having a gasket with integrated lubrication channel for providing lubrication to the surface of an engine part. Preferably, the gasket is a multilayer metal gasket comprised of an upper layer, a bottom layer, and an inner layer disposed between the upper and bottom layers. The gasket further comprises a lubrication channel disposed through the gasket. Lubrication from an oil feed may then be directed through the lubrication channel and directed onto the surface of the engine part to be lubricated.

29 Claims, 5 Drawing Sheets

LUBRICATION SYSTEM HAVING A GASKET WITH INTEGRATED LUBRICATION CHANNEL

BACKGROUND OF THE INVENTION

1. Field of Invention

This invention relates to the field of lubrication systems. More specifically, this invention relates to a lubrication system having a gasket with one or more integrated lubrication channels for providing lubrication to components found in an engine.

2. Background

There are many moving parts in an engine. Lubrication helps these parts move with ease and also increases their durability. Combustion engines, such as those used in lawn mowers, motorcycles, airplanes, trains, and automobiles use oil for lubrication. Typically, oil is drawn from an oil pan, filtered, and then squirted onto the surfaces of various components such as the timing chains, pistons, and cylinder walls. Heretofore, lubrication systems have typically used oil squirters to direct oil onto the desired parts. For example, as shown in FIG. 1, an oil squirter 100 is mounted on an automotive engine block and directs oil onto the surface of a timing chain 105. A gasket, such as gasket 200 shown in FIG. 2 is placed between the engine block and the cylinder head of the engine. Gaskets are a wide variety of seals or packings used between matched machine parts or around pipe joints to prevent the escape of gas or fluid. Gasket 200 is manufactured with a bore 205 through which the oil flows from the block to the cylinder head. The unbroken surface 220 and sealing beads 210 and 215 prevent oil leakage and ensure that excreted oil does not flow into undesired places in or outside the engine. Oil squirter 100 is typically inserted into either the block or cylinder head such that it intersects a high pressure oil passage, such as, but not limited to, that which flows through gasket bore 205.

Special machining of the engine block or head is required to form the bores where the oil squirters are to be mounted. The oil squirters themselves also typically require special machining to fit into the engine and to properly direct and meter the high pressure oil. Those skilled in the art will appreciate that the oil squirters as well as the additional labor associated with the machining of the block and mounting of the oil squirters adds to the building costs of each engine. Thus what is needed is way to provide lubrication to the desired engine components while avoiding the additional machining and parts requirements associated with known lubrication systems.

BRIEF SUMMARY OF THE INVENTION

In one embodiment, the present invention is directed to a lubrication system having a gasket with one or more integrated lubrication channels for providing lubrication to the surface of an engine part. Such parts can include, for example, timing chains, pistons, cams, and other moving parts found in an engine. The lubrication system also includes an oil feed from which lubrication may be drawn. Preferably, the gasket is a multilayer metal gasket comprised of an upper layer, a bottom layer, and an inner layer disposed between the upper and bottom layers in a stacking direction. In the specification and claims, "an" is intended to mean one or more. In an embodiment, the gasket is further comprised of a lubrication channel disposed through the gasket at least in a direction other than the stacking direction of the gasket. In an embodiment, the lubrication channel is in a planar direction of at least one of the upper, bottom, and inner layers. Lubrication from the oil feed may then be channeled through the lubrication channel and directed onto the surface of the engine part to be lubricated. In this way, the lubrication channel enables the gasket to act as an oil squirter.

In an embodiment, the lubrication channel of the gasket is dimensioned so as to provide a constant lubrication flow during operation of the engine. Preferably, the gasket is dimensioned to provide a constant lubrication flow of at least 0.5 liters per minute. In an embodiment, the lubrication channel is dimensioned so as to have an effective working diameter or cross section of approximately 0.75 mm.

In yet another embodiment, a gasket is provided with multiple lubrication channels. In this way, the gasket is able to channel lubrication onto multiple surfaces.

Further features of the present invention, as well as the structure of various embodiments of the present invention are described in detail below with reference to the accompanying drawings.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
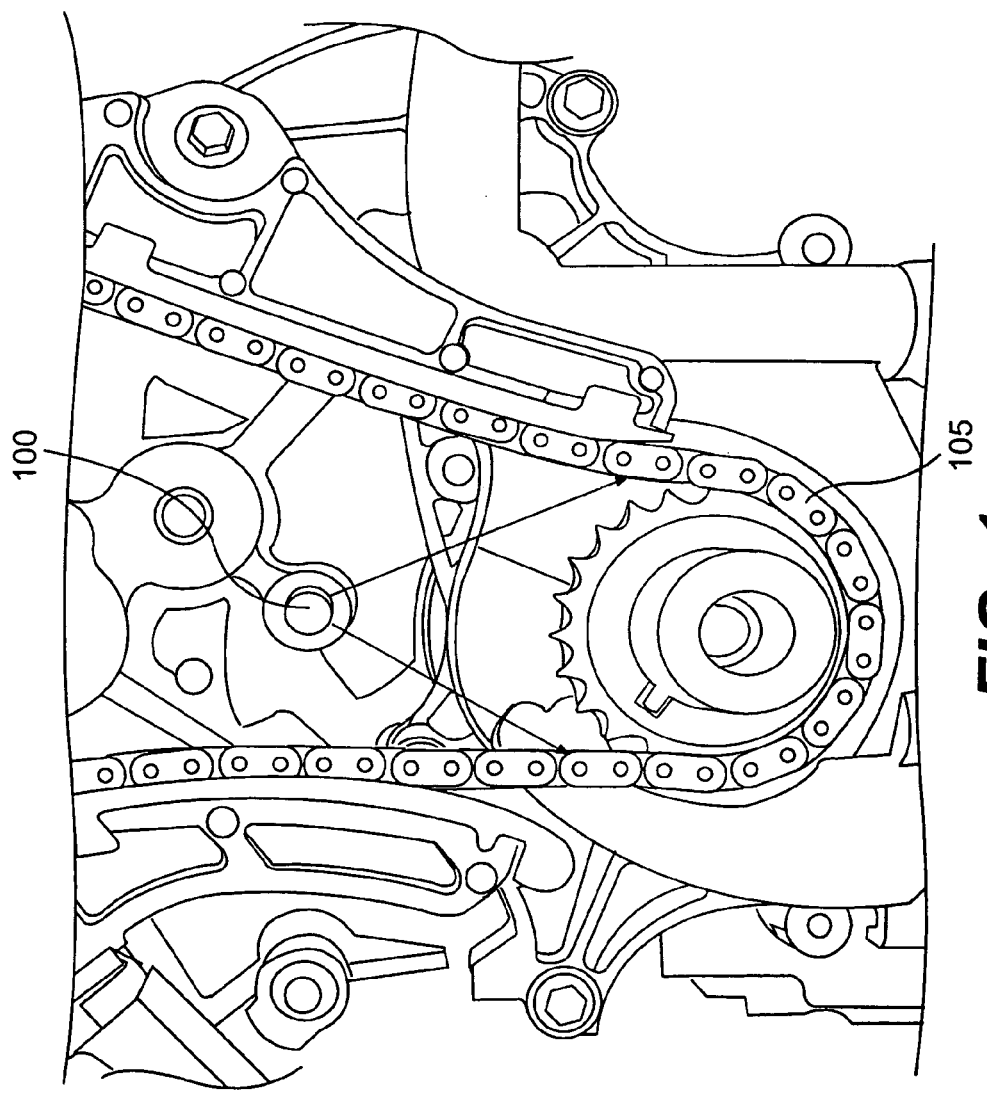
FIG. 1 is an illustration depicting a conventional block mounted oil squirter lubrication system for an automotive engine.
Figure 2:
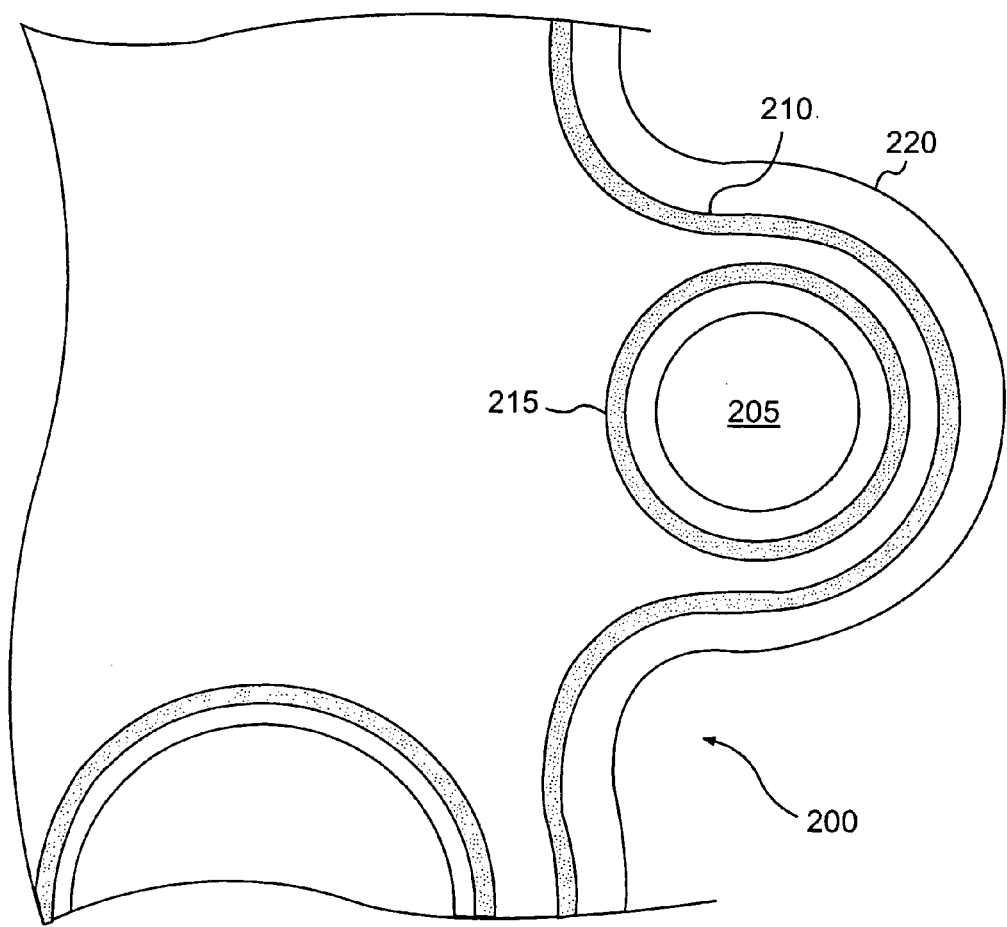
FIG. 2 is a top plan view of a conventional gasket used with the conventional block mounted oil squirter of FIG. 1.
Figure 3A:
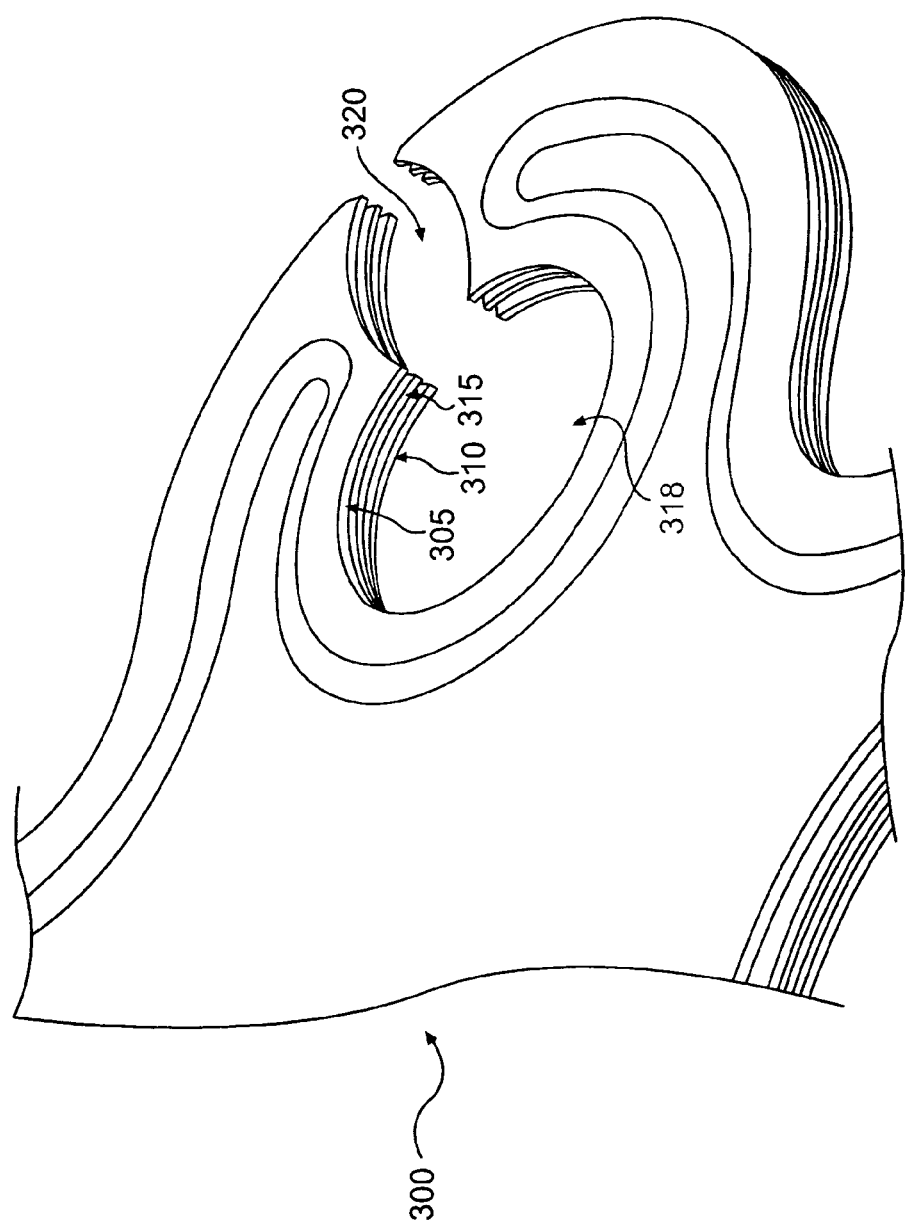
FIG. 3A is a side elevation view of a gasket with integrated lubrication channel according to an embodiment of the present invention.
Figure 3B:
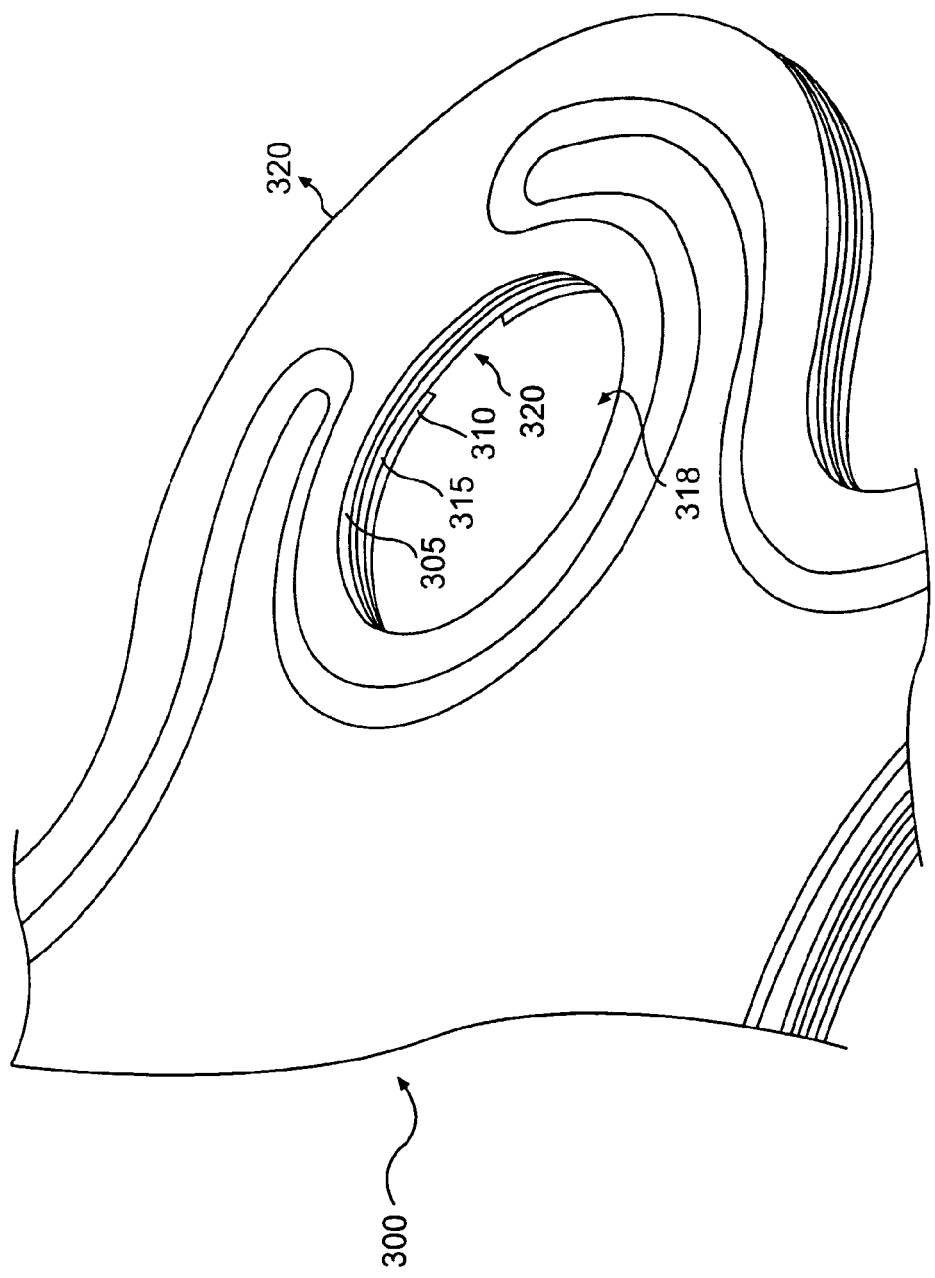
FIG. 3B is a side elevation view of a gasket with integrated lubrication channel according to another embodiment of the present invention.

Referring now to FIG. 3A, a gasket 300 designed in accordance with an embodiment of the present invention will now be described. Gasket 300 is comprised of an upper layer 305 and a bottom layer 310 stacked in a stacking direction of gasket 300. Gasket 300 may also comprise an inner layer 315 disposed between the upper layer 305 and bottom layer 310 in a stacking direction of gasket 300. Preferably, the upper layer 305, bottom layer 310 and inner layer 315 are each formed from metal plates. In an embodiment, the layers are each formed from steel. As would be understood by persons skilled in the relevant art, the selection of metal and thickness for each layer may vary depending on the intended placement of the gasket. Using conventional stamping and lamination operations, the upper, bottom, and inner layers may be provided with an aperture and are joined with the other layers so as to form a lubrication channel 320. In an embodiment, lubrication channel 320 is disposed between each of the upper, bottom, and inner layers. As shown in FIG. 3B, lubrication channel 320 may also be disposed between the bottom layer and at least one of the inner layers. Preferably, the lubrication channel 320 is disposed through gasket 300 at least in a direction other than the stacking direction of gasket 300. In an embodiment, the lubrication channel 320 is disposed in a planar direction of gasket layers. Lubrication channel 320 may be in fluid communication with a lubrication port or bore 318. In this way, lubrication from an oil feed may be channeled from lubrication port 318, through lubrication channel 320, and directed onto a desired engine component surface. Alternatively, lubrication channel 320 may be in direct fluid communication with an oil feed in which case, lubrication port or bore 318 is unnecessary.

The dimensions of the lubrication channel 320 will depend upon the desired lubricating application. In the present example, the invention is used to lubricate a timing chain. In accordance with this application, the lubrication channel 320 may provide at least 0.5 liters per minute of lubrication flow in an embodiment. Accordingly, the lubrication channel 320 is dimensioned so as to have an effective working diameter or cross section in the range of 0.1 to 1 mm. In an embodiment, the lubrication channel 320 has an aperture in the range of 0.25 to 0.75 mm.

The illustrated embodiments show gasket 300 with a single integrated lubrication channel 320. However, such configuration is for example only, and not limitation. In an alternative embodiment, gasket 300 may be configured with multiple lubrication channels. In this way, lubrication may be channeled through different lubrication channels and directed onto multiple lubrication surfaces.

Figure 4:
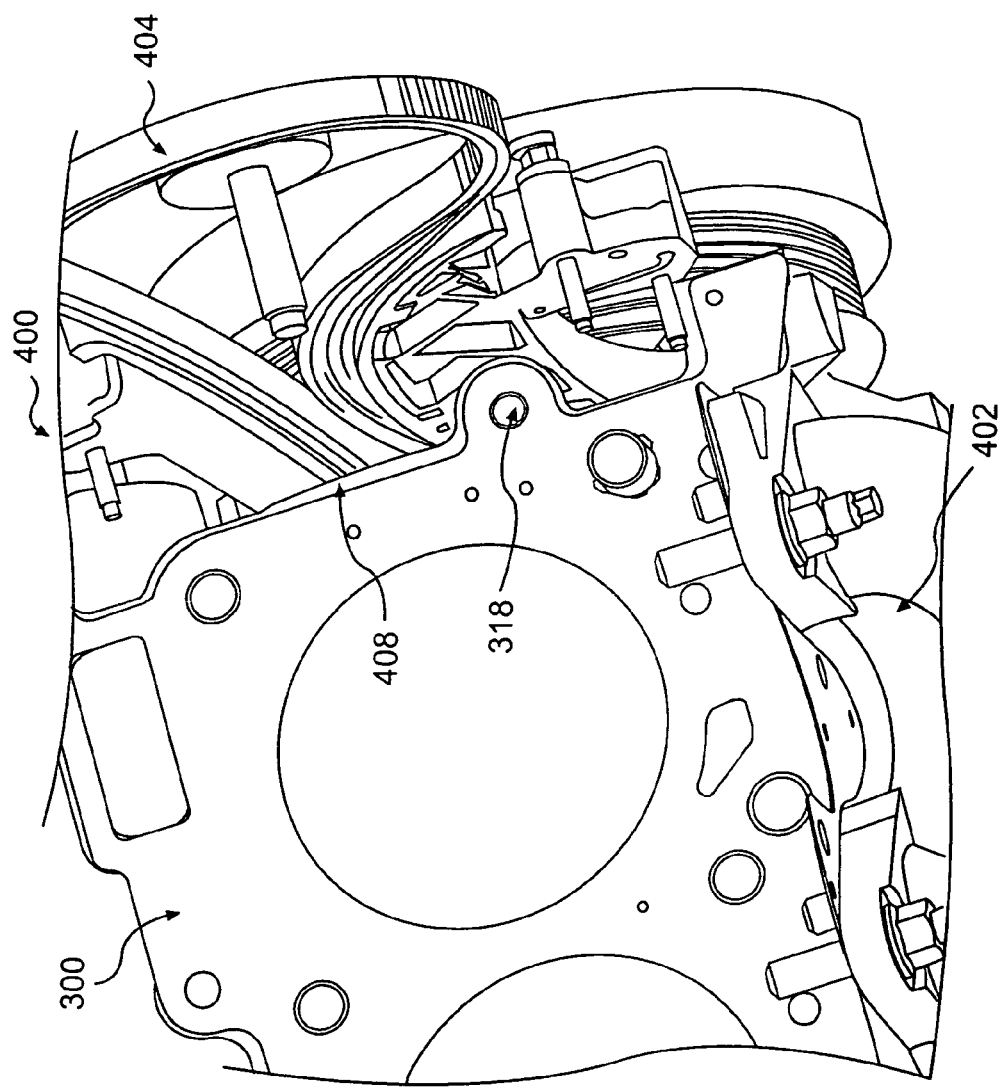
FIG. 4 is an illustration depicting a lubrication system for an automotive engine according to an embodiment of the present invention.

Referring now to FIG. 4, a lubrication system 400 for lubricating one or more component surfaces in an automotive engine 402 will now be described. Automotive engines are typically identified, in part, according to the manner in which the cylinders are arranged. For example, the cylinders of an inline engine (I) are arranged in a straight line on a single bank. In comparison, the cylinders of a V or W engine are arranged in two or more banks, a first bank and a second bank, or more, placed at an angle to one another—hence the term V or W engine. The first bank is associated with a first lubrication surface and the second bank is associated with a second lubrication surface and so on. In an embodiment, first and second lubrication surfaces are timing devices, such as the timing chain 404. The present invention may be configured for use with any of the aforementioned engines as well as any other engine requiring both a seal and a lubricating device.

In an embodiment, lubrication system 400 is comprised of an oil feed 318 and a gasket 300. Preferably the oil feed is a high pressure oil feed. In this example, gasket 300 has been designed as a cylinder head gasket intended for placement between the cylinder head (not shown) and the cylinder block 408 of automotive engine 402. However, persons skilled in the relevant art will recognize, based at least in part of the teachings herein, that gasket 300 may be designed for placement in any other areas of an engine where both a seal and a lubricating mechanism are needed.

Heretofore, the goal of gasket design and manufacturing has been to provide and maintain a leak proof seal between two mated surfaces. However, contrary to conventional approaches, gasket 300 is designed to enable fluid flow. More specifically, lubrication system 400 is designed such that lubrication from the oil feed may be passed through the integrated lubrication channel of gasket 300 and squirted onto a desired surface, such as timing chain 404. In this way, the gasket 300 is able to serve its traditional role of providing a leak proof seal while also acting as a lubrication device.

While various embodiments of the present invention have been described above, it should be understood that they have been presented by way of example only and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A gasket comprising:
an upper layer, a bottom layer; and an inner layer stacked in a stacking direction of the gasket, further comprising a lubrication channel through the gasket, wherein the lubrication channel is disposed through the gasket in a direction approximately normal to the stacking direction of the gasket.

2. The gasket of claim 1, the lubrication channel is in a planar direction of at least one of the upper, the bottom, or the inner layer.

3. The gasket of claim 1, the lubrication channel is in a planar direction of the upper layer, the bottom layer and the inner layer.

4. The gasket of claim 1, wherein the lubrication channel is disposed through at least one portion of the inner layer and at least one of the upper or bottom layers.

5. The gasket of claim 1, wherein the lubrication channel directs oil onto an engine component surface.

6. The gasket of claim 5, wherein the surface is a timing chain surface.

7. The gasket of claim 1, wherein the lubrication channel is disposed through each of the upper, bottom, and inner layers.

8. The gasket of claim 1, wherein the gasket is a cylinder head gasket.

9. The gasket of claim 1, wherein the upper layer, bottom layer, and inner layer are formed from metal plates.

10. The gasket of claim 1, wherein the lubrication channel is dimensioned so as to provide a lubrication flow rate of at least 0.5 liters per minute.

11. The gasket of claim 1, wherein the lubrication channel has an aperture in the range of 0.1 to 1 mm.

12. The gasket of claim 1, wherein the lubrication channel has an aperture in the range of 0.25 to 0.75 mm.

13. A lubrication system, comprising a gasket and an oil galley from which a lubricant is channeled through a lubrication channel, the gasket comprising:
an upper layer, a bottom layer; and an inner layer stacked in a stacking direction of the gasket, further comprising the lubrication channel through the gasket, wherein the lubrication channel is disposed through the gasket at least in a direction other than the stacking direction of the gasket.

14. The lubrication system of claim 13, the lubrication channel is in a planar direction of at least one of the upper, the bottom, or the inner layers.

15. The lubrication system of claim 13, the lubrication channel is in a planar direction of the upper, the bottom, and the inner layers.

16. The lubrication system of claim 13, wherein the lubrication channel is disposed between the upper and bottom layers.

17. The lubrication system of claim 13, wherein the lubrication channel directs oil onto an engine component surface.

18. The lubrication system of claim 13, wherein the lubrication channel is disposed through each of the upper, bottom, and inner layers.

19. The lubrication system of claim 13, wherein the gasket is a cylinder head gasket.

20. The lubrication system of claim 13, wherein the upper layer, bottom layer, and inner layer are formed from metal plates.

21. The lubrication system of claim 20, wherein the surface is a timing chain surface.

22. The lubrication system of claim 13, wherein the lubrication channel is dimensioned so as to provide a lubrication flow rate of at least 0.5 liters per minute.

23. The lubrication system of claim 13, wherein the lubrication channel has an aperture in the range of 0.1 to 1 mm.

24. The lubrication system of claim 13, wherein the lubrication channel has an aperture in the range of 0.25 to 0.75 mm.

25. The lubrication system of claim 17, wherein the engine is an automotive engine.

26. The lubrication system of claim 25, wherein the automotive engine is a V-type engine having a first bank and a second bank and further wherein the first bank is associated with a first lubrication surface and the second bank is associated with a second lubrication surface.

27. The lubrication system of claim 26, wherein the first lubrication surface and the second lubrication surface are surfaces of timing devices.

28. The lubrication system of claim 25, wherein the automotive engine is a W-type engine having two or more banks, wherein each bank is associated with a lubrication surface.

29. The lubrication system of claim 25, wherein the automotive engine is an inline engine.

* * * * *